(12) United States Patent
Guo et al.

(10) Patent No.: US 8,564,960 B2
(45) Date of Patent: *Oct. 22, 2013

(54) FIXING APPARATUS FOR STORAGE DEVICE

(75) Inventors: Jun Guo, Shenzhen (CN); Guang-Yi Zhang, Shenzhen (CN); Wen-Tang Peng, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 165 days.

This patent is subject to a terminal disclaimer.

(21) Appl. No.: 13/212,198

(22) Filed: Aug. 18, 2011

(65) Prior Publication Data

US 2013/0037676 A1 Feb. 14, 2013

(30) Foreign Application Priority Data

Aug. 8, 2011 (CN) .......................... 2011 1 0225612

(51) Int. Cl.
*H05K 7/16* (2006.01)
(52) U.S. Cl.
USPC ................... 361/726; 248/22.13; 248/222.52; 312/223.2; 361/732

(58) Field of Classification Search
USPC ......... 312/223.2, 265.5, 265.6; 361/615, 616, 361/726, 730, 732; 248/27.1, 27.3, 220.21, 248/220.22, 221.11, 222.13, 222.52, 248/222.41, 223.21, 225.11
See application file for complete search history.

(56) References Cited

U.S. PATENT DOCUMENTS

| | | | | |
|---|---|---|---|---|
| 4,930,694 A * | 6/1990 | Yoshitake et al. | ............ | 224/547 |
| 6,452,792 B1 * | 9/2002 | Chen | ......................... | 361/679.35 |
| 6,616,106 B1 * | 9/2003 | Dean et al. | .................... | 248/27.1 |
| 6,944,013 B2 * | 9/2005 | Yang | ......................... | 361/679.33 |
| 7,440,271 B2 * | 10/2008 | Chen et al. | ............... | 361/679.33 |
| 7,440,272 B2 * | 10/2008 | Chen et al. | ............... | 361/679.33 |
| 7,630,197 B2 * | 12/2009 | Chen | ......................... | 361/679.33 |

* cited by examiner

*Primary Examiner* — Alfred J Wujciak
(74) *Attorney, Agent, or Firm* — Altis & Wispro Law Group, Inc.

(57) ABSTRACT

An apparatus includes a board presenting a number of engaging portions and a post, and a matching casing containing a data storage device. The casing defines a number of engaging holes and a fixing member on one side. The fixing member includes a first sliding portion and a second sliding portion locating at opposite sides of the post which define a curving slot in which the post can slide. The fixing member is rotated to lock the casing to the board, and rotate back to unlock the casing from the board.

12 Claims, 6 Drawing Sheets

FIXING APPARATUS FOR STORAGE DEVICE

CROSS-REFERENCE OF RELATED APPLICATION

Relevant subject matter is disclosed in a pending U.S. patent application, titled "FIXING APPARATUS FOR STORAGE DEVICE", filed on Aug. 16, 2011, with the application Ser. No. 13/211,283, which is assigned to the same assignee as this patent application.

BACKGROUND

1. Technical Field

The present disclosure relates to an apparatus for fixing a data storage device.

2. Description of Related Art

An electronic device, such as a computer, is generally equipped with a data storage device, such as a hard disk drive. Mounting the storage device to the electronic device by screws is inefficient and always requires a tool, such as a screw driver, which is inconvenient.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
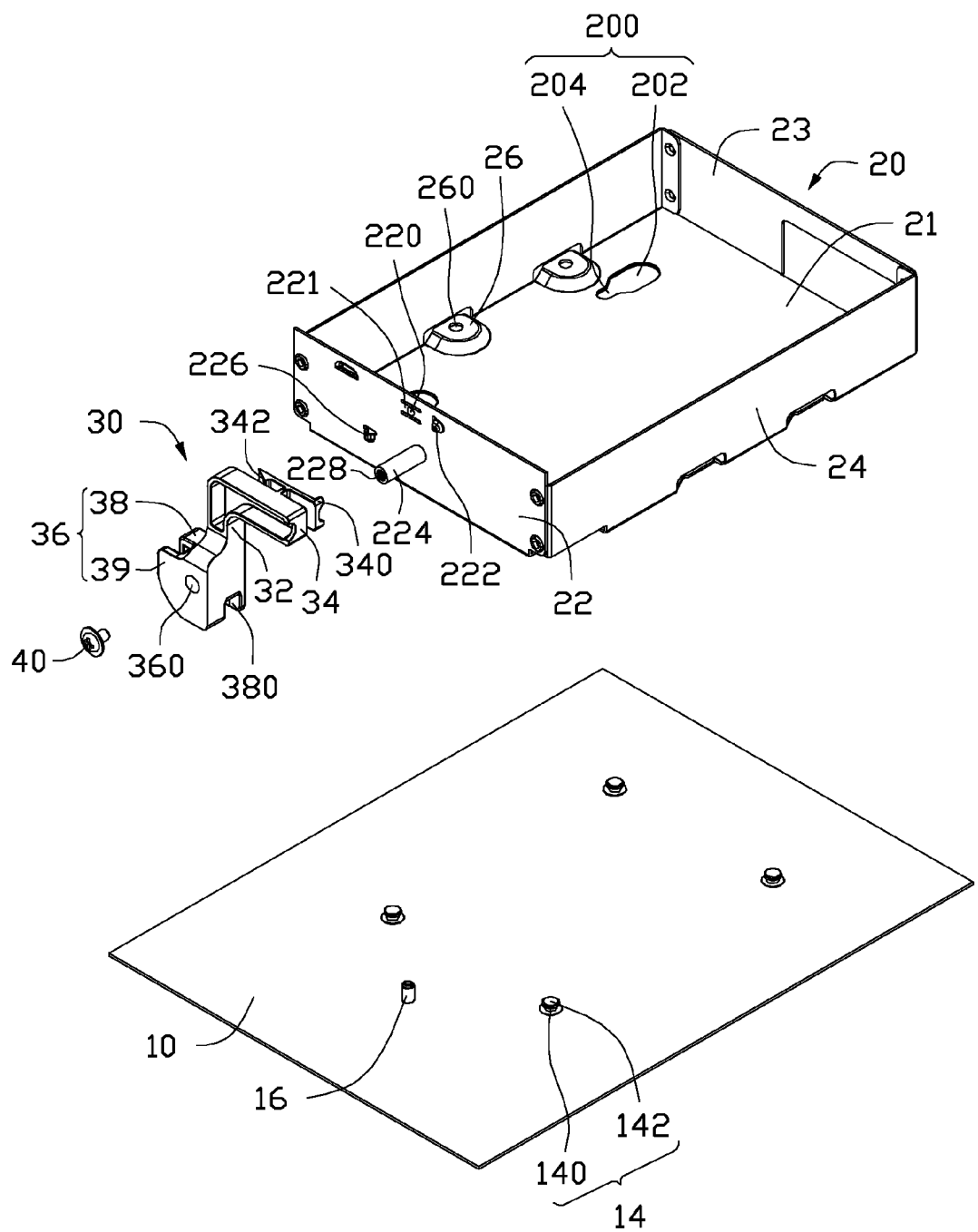
FIG. 1 is an exploded, isometric view of an exemplary embodiment of an apparatus for a data storage device.

Referring to FIG. 1, an exemplary embodiment of a fixing apparatus for fixing a data storage device, such as a hard disk drive, includes a board 10, a casing 20 for receiving the data storage device, and a fixing member 30.

The board 10 presents four engaging portions 14 arranged adjacent to the four corners of a rectangular plate, and a post 16 outside the internal rectangle formed by the engaging portions 14. Each engaging portion 14 includes a neck 140 extending in a substantially perpendicular manner from the board 10 and a head 142 mounted to the distal end of the neck 140. The diameter of the head 142 is greater than the diameter of the neck 140.

The casing 20 includes a bottom wall 21, a front wall 22 and a back wall 23 extending in a substantially perpendicular manner from the ends of the bottom wall 21, and two sidewalls 24 extending in a substantially perpendicular manner from the sides of the bottom wall 21. A pair of supporting portions 26 protrudes from the bottom wall 21, adjacent to each of the two sidewalls 24. Each supporting portion 26 defines a fixing hole 260 in the top of the supporting portion 26.

The bottom wall 21 defines four engaging holes 200 to accommodate the engaging portions 14. Each engaging hole 200 includes a first hole 202 adjacent to the back wall 23, and a second hole 204 away from the back wall 23 and communicating with the first hole 202. The size of the first hole 202 is substantially greater than the size of the second hole 204.

A resilient piece 221 is formed on the front wall 22. A hemispherical projection 220 protrudes from an outer surface of the resilient piece 221. The projection 220 is disposed substantially between a limiting portion 226 and a blocking portion 222 which extend out from the front wall 22. A threaded sleeve 224 axially defining a threaded hole 228 extends from the outer surface of the front wall 22. The threaded sleeve 24 is located below the projection 220 and between it and the blocking portion 222. A latching portion 230 protrudes from an inner surface of the front wall 22 (referring to FIG. 4).

Figure 5:
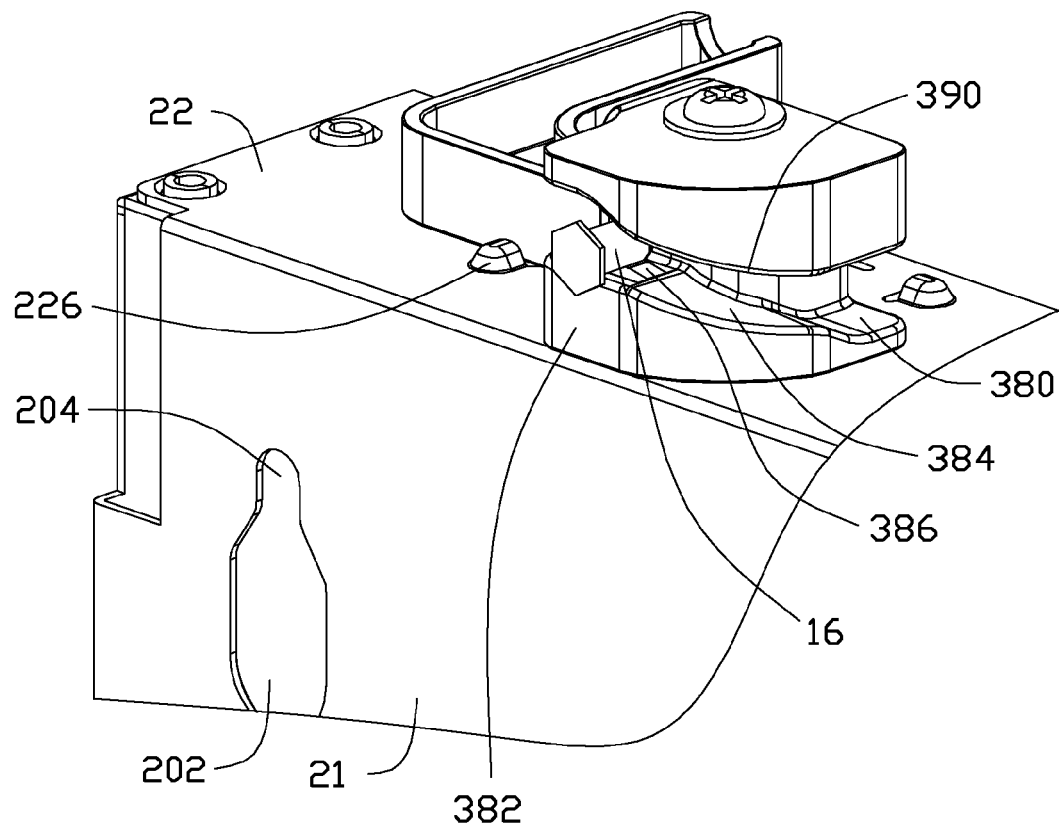
FIG. 5 is a partial, enlarged view of the fixing member of FIG. 1, but viewed from yet another perspective.

Referring to FIG. 5, the fixing member 30 includes a connecting portion 32, an operation portion 34 extending in a substantially perpendicular manner from an end of the connecting portion 32, and a main body 36 extending from the other end of the connecting portion 32 opposite to the operation portion 34. A latch 340 extends from the back side of the operation portion 34. A hook 342 extends from a distal end of the latch 340 toward the operation portion 34. The main body 32 includes a locking portion 38 locating at the back side of the main body 32 and a release portion 39 locating at the front side of the main body 32 opposite to the back side. A through hole 360 which extends through the locking portion 38 and the release portion 39 is defined in the main body 36. A protrusion 382 extends from an end of the locking portion 38 and away from the operation portion 34. An elastic portion 386 protrudes from the front surface of the protrusion 382 facing the release portion 39. A flat piece 380 extends down from the other end of the main body 36 opposite to the protrusion 382. A circular ramp or wedge (first sliding portion 384) is formed on the front surface of the locking portion 38 between the protrusion 382 and the flat piece 380, and is inclined upward toward the release portion 39. The release portion 39 forms a second sliding portion 390 which is inclined downward toward the first sliding portion 384, such that a curving slot of one certain width is created between the first and second sliding portions 38 and 39. The distance between the operation portion 34 and the through hole 360 is greater than the distance between the flat piece 380 and the through hole 360.

Figure 2:
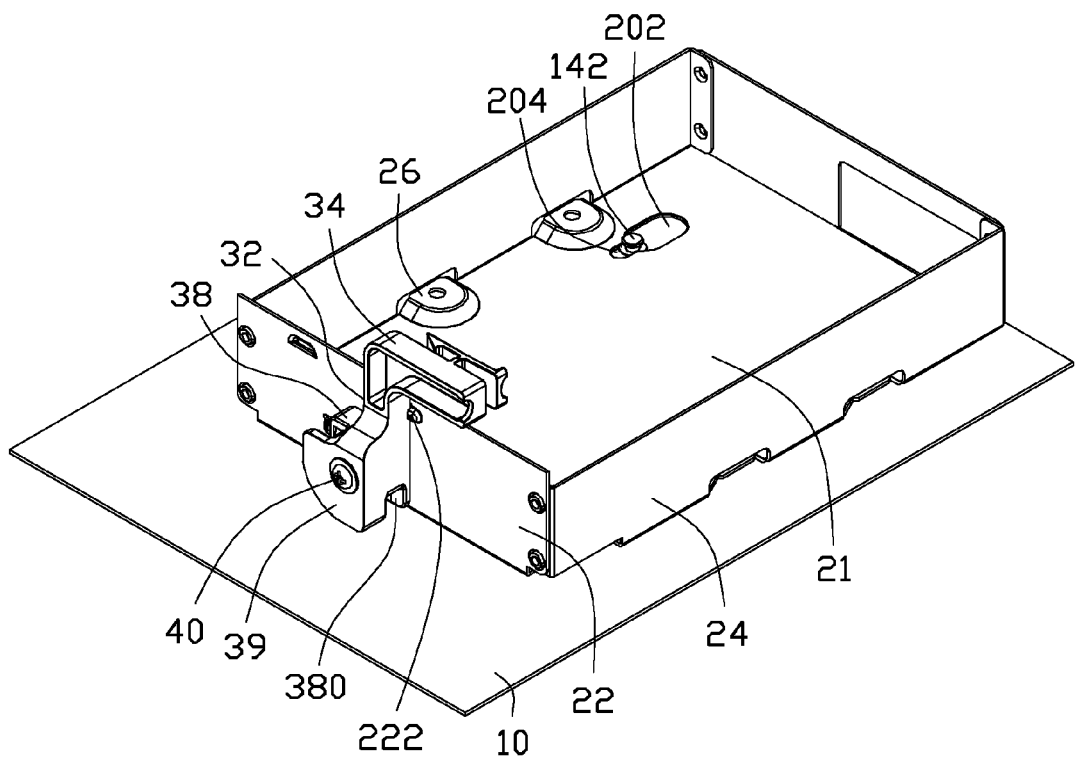
FIG. 2 is an isometric view of FIG. 1 in an assembled state.

Referring to FIG. 2, in assembly, the threaded sleeve 224 extends through the through hole 360. A fastener 40 engages in the threaded hole 228 to secure the fixing member 30, thereby pivotably mounting the fixing member 30 to the front wall 22. At this time, the rotation of the connecting portion 32 is limited by the projection 220 and the blocking portion 222. The data storage device (not shown) is supported and fixed on the supporting portions 26. The casing 20 (with the storage device within) is placed on the board 10 so that the engaging portions 14 extend into the corresponding first holes 202. The flat piece 380 is located between the post 16 and the front wall 22. The release portion 39 is located at the side of the post 16 opposite to the flat piece 380.

Figure 3:
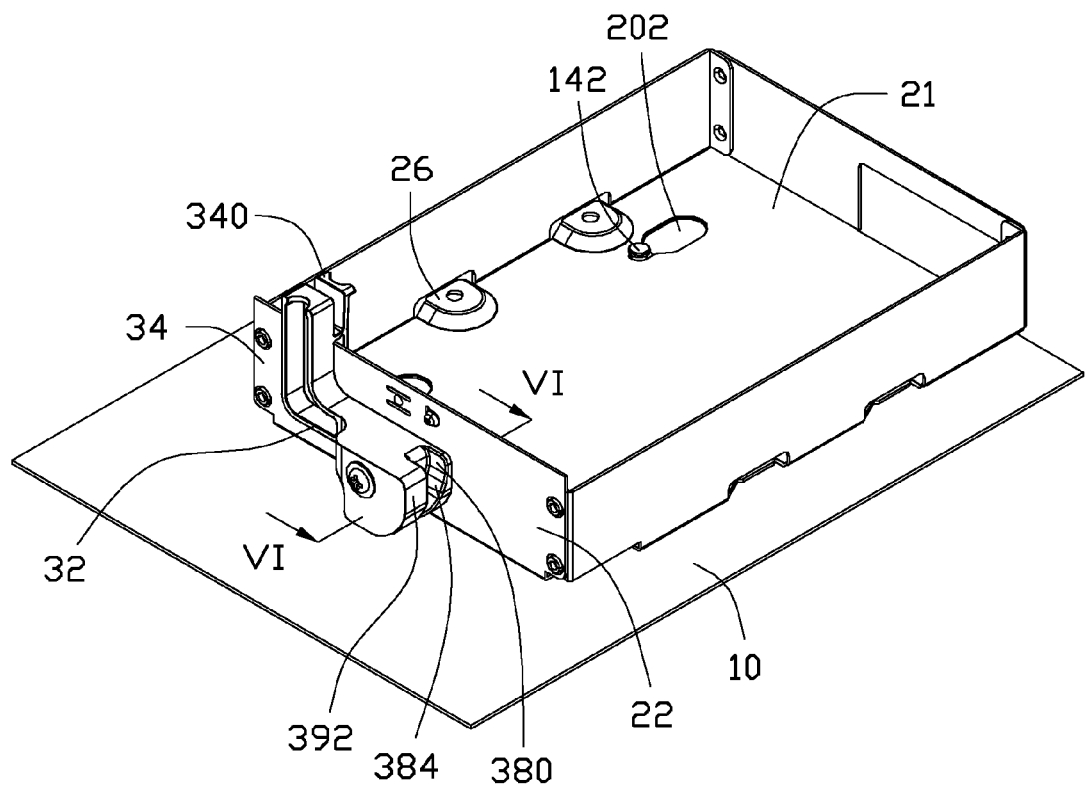
FIG. 3 is similar to FIG. 2, but showing another state of use.
Figure 4:
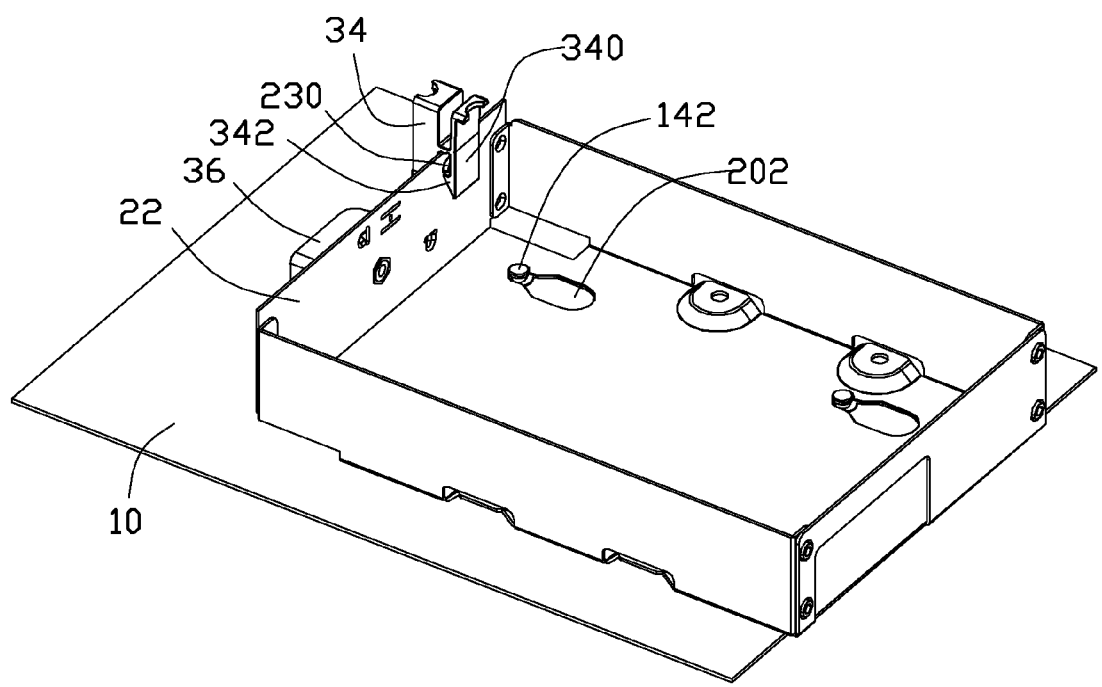
FIG. 4 is similar to FIG. 3, but viewed from another perspective.

Referring to FIGS. 3 to 5, in use, the operation portion 34 is rotated toward the limiting portion 226, until the connecting portion 32 abuts the limiting portion 226 and the hook 342 engages with the latching portion 230. The presence of the post 16 against the first sliding portion 384 causes the casing 20 away from the post 16, until all the necks 140 are received in the corresponding second holes 204. At the end of the rotation, the post 16 abuts the elastic portion 386, and the bottom wall 21 is locked by the heads 142.

Figure 6:
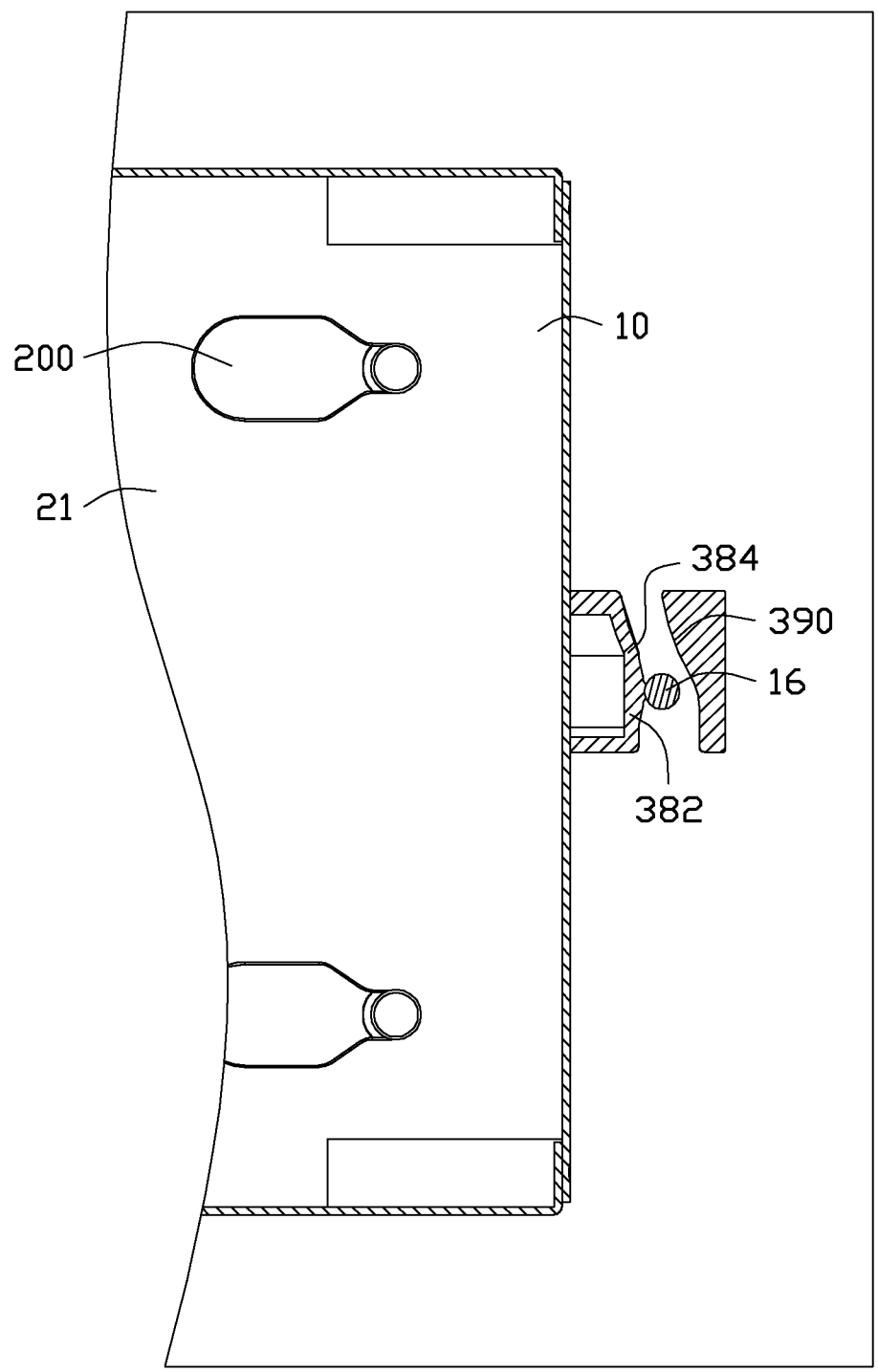
FIG. 6 is a sectional view of FIG. 3, taken along the line of VI-VI.

Referring to FIG. 6, in disengaging the casing 20 from the board 10, the hook 342 is disengaged from the latching portion 230 and the fixing member 30 is rotated to make the operation portion 34 move toward the blocking portion 222, until the connecting portion 32 is sandwiched between the projection 220 and the blocking portion 222. The second sliding portion 390 slides against the post 16 so as to pull the casing 20 forward toward the post 16, until the engaging portions 14 move into the corresponding first holes 202 and the casing 20 can be lifted away.

As the supporting portions 26 protrude from the bottom wall 21, the bottom of the storage device is never in contact with the bottom wall 21.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A fixing apparatus for storing an electronic device, comprising:
   a board forming a plurality of engaging portions and a post all extending up from the board;
   a casing comprising a bottom wall defining a plurality of engaging holes, corresponding to the engaging portions, and an end wall extending in a substantially perpendicular manner from the bottom wall; each engaging hole comprising a first hole and a corresponding second hole communicating with the first hole; wherein the size of the first hole is greater than the size of the second hole; and
   a fixing member pivotably mounted to the end wall, the fixing member comprising a locking portion and a release portion facing to each other, the locking portion forming a first sliding portion facing to the release portion, a protrusion extending from a first end of the fixing member, the release portion forming a second sliding portion facing to the first sliding portion, wherein an inner surface of the first sliding portion is slanted toward the release portion from a second end of the first sliding portion opposite to the protrusion to the protrusion, an inner surface of the second sliding portion is slanted toward the first sliding portion from a first end of the second sliding portion corresponding to the protrusion to a second end of the second sliding portion opposite to the first end;
   wherein when mounting the casing to the board, the engaging portions extend into the first holes of the corresponding engaging holes, the fixing member is pivoted to drive the first sliding portion to slide along the post, the slanted inner surface of the first sliding portion slidably resists abutting the post to move the casing away from the post, until the engaging portions engage in the corresponding second holes, and the protrusion resists against the post; when disassembling the casing from the board, the fixing member is pivoted to drive the second sliding portion to slide along the post, the slanted inner surface of the second sliding portion slidably abutting the post to move the casing toward the post, until the engaging portions enter the corresponding first holes.

2. The fixing apparatus of claim 1, further comprising a fastener, wherein the fixing member defines a through hole extending through the locking portion and the release portion, a threaded sleeve extends out from the end wall to pivotably extend through the through hole, the fastener engages with a distal end of the threaded sleeve opposite to the end wall to block the fixing member.

3. The fixing apparatus of claim 2, wherein a connecting portion is connected to tops of the locking portion and the release portion at the first end of the fixing member, the end wall forms a projection and a blocking portion above the threaded sleeve and at opposite sides of the threaded sleeve to sandwich the connecting portion when the first sliding portion is located between the post and the end wall.

4. The fixing apparatus of claim 3, wherein a resilient piece is formed on the front wall, the projection protrudes from the outer surface of the resilient piece.

5. The fixing apparatus of claim 3, wherein the end wall forms a limiting portion at a side of the threaded sleeve to block the connecting portion when the post resists against the protrusion.

6. The fixing apparatus of claim 3, wherein an operation portion extends from a top of the connecting portion opposite to the locking portion and the release portion.

7. The fixing apparatus of claim 6, wherein a latching portion protrudes from an inner surface of the end wall opposite to the fixing member, a latch extends from the operation portion to latch with the latching portion when the post resists against the protrusion.

8. The fixing apparatus of claim 6, wherein the distance between the operation portion and the through hole is greater than the distance between the flat piece and the through hole.

9. The fixing apparatus of claim 1, wherein each engaging portion comprises a neck extending from the bottom wall, and a head extending from a distal end of the neck opposite to the bottom wall, when the neck is received in the corresponding second hole, the head is blocked by an inner surface of the bottom wall.

10. The fixing apparatus of claim 1, wherein a plurality of supporting portions protrudes up from the bottom wall.

11. The fixing apparatus of claim 1, wherein an elastic portion extends from the protrusion to abut the post when the engaging portions engage in the corresponding second holes.

12. The fixing apparatus of claim 1, wherein the second hole of each engaging hole is closer to the end wall than the corresponding first hole of each engaging hole.

* * * * *